United States Patent
Pedersen et al.

(10) Patent No.: US 10,869,481 B2
(45) Date of Patent: Dec. 22, 2020

(54) METHOD FOR CONTROLLING NEMATODE PESTS

(71) Applicant: Syngenta Participations AG, Basel (CH)

(72) Inventors: Palle Pedersen, Stanton, MN (US); Clifford George Watrin, Minnetonka, MN (US)

(73) Assignee: Syngenta Participations AG, Basel (CH)

( * ) Notice: Subject to any disclaimer, the term of this patent is extended or adjusted under 35 U.S.C. 154(b) by 144 days.

(21) Appl. No.: 15/304,090

(22) PCT Filed: Apr. 16, 2015

(86) PCT No.: PCT/US2015/026074
§ 371 (c)(1),
(2) Date: Oct. 14, 2016

(87) PCT Pub. No.: WO2015/167809
PCT Pub. Date: Nov. 5, 2015

(65) Prior Publication Data
US 2017/0035054 A1    Feb. 9, 2017

Related U.S. Application Data

(60) Provisional application No. 61/984,891, filed on Apr. 28, 2014.

(51) Int. Cl.
*A01N 63/00*    (2020.01)
*A01N 63/02*    (2006.01)
*A01N 63/10*    (2020.01)

(52) U.S. Cl.
CPC ............. *A01N 63/00* (2013.01); *A01N 63/10* (2020.01); *Y02A 50/30* (2018.01)

(58) Field of Classification Search
None
See application file for complete search history.

(56) References Cited

U.S. PATENT DOCUMENTS

| 6,784,337 B1 | 8/2004 | Atkinson et al. |
| 8,497,228 B2 | 7/2013 | Hungenberg et al. |
| 2013/0340123 A1* | 12/2013 | Pedersen ............... A01N 43/36 800/298 |

FOREIGN PATENT DOCUMENTS

| WO | 2007/087153 A2 | 8/2007 | |
| WO | 2012/140212 A2 | 10/2012 | |
| WO | WO-2012140212 A2 * | 10/2012 | ............. A01N 63/10 |

OTHER PUBLICATIONS

Siddiqui et al., Bioresource Technology, vol. 69, pp. 167-179 (1999) (of record).*
Atibalentja et al., Journal of Nematology, vol. 36, No. 2, pp. 171-180 (2004). (Year: 2004).*
Noel et al., International Journal of Systematic and Evolutionary Microbiology, vol. 55, pp. 1681-1685 (2005). (Year: 2005).*
Mohan et al., FEMS Microbiology Ecology, vol. 79, No. 3, pp. 675-684 (2012). (Year: 2012).*
Siddiqui et al., Bioresource Technology, vol. 69, pp. 167-179 (1999) (of record). (Year: 1999).*
Ali et al. "Overexpression of the transcription factor RAP2.6 leads to enhanced callose deposition in syncytia and enhanced resistance against the beet cyst nematode Heterodera schachtii in *Arabidopsis* roots", BMC Plant Biology, 2013, 13:47 pp. 1-17.
International Search Report for International Patent Application No. PCT/US2015/026074 dated Jul. 21, 2015.

* cited by examiner

*Primary Examiner* — Soren Harward
*Assistant Examiner* — Paul D Pyla
(74) *Attorney, Agent, or Firm* — Baker & Hostetler LLP; Toni-Junell Herbert

(57)    ABSTRACT

Plant propagation material expressing sugar beet cyst nematode resistance can be treated with a nematode-antagonistic biocontrol agent. Use of the nematode-antagonistic biocontrol agent can reduce the rate at which sugar beet cyst nematode (SBN) pests acquire tolerances to pesticidal activity of sugar beet plants expressing SBN resistance and pesticides, and can also increase yield and pesticidal activity.

17 Claims, No Drawings

METHOD FOR CONTROLLING NEMATODE PESTS

RELATED APPLICATION INFORMATION

This application is a 371 of International Application No. PCT/US2015/026074, filed Apr. 16, 2015, which claims priority to U.S. Provisional Patent Application No. 61/984,891, filed Apr. 28, 2014, the contents of which are incorporated herein by reference herein.

FIELD OF TECHNOLOGY

The present technology relates generally to the control of pests which cause damage to sugar beet plants by their feeding activities, and more particularly the control of nematodes by the combination of sugar beet seed having a sugar beet nematode resistant trait and the treatment of the sugar beet seed with a nematicide prior to planting the seed.

BACKGROUND

Insects and related pests are commonly known to damage agricultural crops. The damage to the crops adversely affects the yield of such crops. One such pest known to damage crops is the nematode. There are many types of nematode pests, one such nematode is the sugar beet nematode (SBN) *Heterodera schachtii*. SBN causes substantial losses in sugar beet production, and based on such losses some varieties of sugar beets (both transgenic and non-transgenic) have been bred to express a characteristic in the plant which reduces damage to the SBN.

Generally, seed treatments can protect the developing seedling from seed and soil borne pathogens and insect pests, as well as early foliar diseases and insects. Seed treatments can control pathogens and insects with very much reduced rates of active ingredient (a.i.) compared with soil or foliar applications. As the a.i. is restricted to the region around the seed and to those pathogens and insects attacking the developing seedling, seed treatments give biological, environmental and economical benefits.

SUMMARY

By way of summary, the current disclosure is directed to, inter alia, a variety of methods, compositions, and propagation material. In one embodiment, the disclosure includes a method for preventing damage by a pest to a plant seed and/or the seed's resulting propagation by treating an SBN resistant or tolerant sugar beet seed with at least one nematicide.

An embodiment includes a method for increasing pesticidal activity on nematode pests by treating plant propagation material expressing SBN resistance or tolerance with nematicide.

An embodiment includes a method for reducing the rate at which pests acquire increased tolerances to sugar beets expressing an SBN resistant or tolerant gene trait (i.e., SBN resistant or tolerant sugar beets) and pesticides by implementing a dual-mode of action to control the pest. The first mode being the use of an SBN resistant or tolerant sugar beet and the second being the use of pesticides applied to the plant seed. The present technology is also directed to extending the useful life of both SBN resistant or tolerant sugar beets and pesticides by implementing a dual-mode of action to control the pest.

An embodiment includes plant propagation material expressing SBN resistance or tolerance which is treated with at least one nematicide, optionally treated with at least one insecticide. The treated plant propagation material provides for a reduction of pest damage to a plant seed and/or the seed's resulting propagation (e.g. plant shoots, stems and foliage).

An embodiment also includes a method of increasing yield in sugar beet plants expressing SBN resistance or tolerance by treating the sugar beet seed with a nematicide in the substantial absence of pest pressure, and specifically in the substantial absence of SBN pest pressure. In certain embodiments, the nematicide may be a nematode-antagonistic biocontrol agent or a synthetic nematicide. It should also be clear, that in some aspects, the present disclosure is inclusive of methods of increasing yield in sugar beet plants expressing SBN resistance in the presence of SBN pest pressure.

The above summary was intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention, the scope of which should be properly determined by the appended claims.

DETAILED DESCRIPTION

In accordance with the present technology, the treatment of unsown, SBN resistant or tolerant sugar beet plant seeds treated with a composition that includes at least one nematicide has improved pest control characteristics. Characteristics may include protecting the plant seed from pests as well as increased protection of the plant from SBN pest damage.

In many examples, the use of nematicides for controlling SBN on SBN resistant or tolerant sugar beet plants, which contain for instance, genes expressing SBN resistance or tolerant activity or native traits with SBN resistance or tolerant activity, show a high control of SBN pests.

In particular, it has been found that within the scope of technology that treating plant seeds expressing SBN resistance or tolerance with at least one nematicide having activity against SBN has advantageous properties, which include, inter alia, increased pesticidal activity and an extended useful pesticidal life of both the SBN resistant or tolerant plant and the nematicide.

The extension of the useful pesticidal life both the SBN resistant or tolerant plant and the pesticide is achieved through the dual-mode action of the pesticides. The dual-mode of action refers to the application of a pesticide to a plant, plant seed, or plant propagation material, which expresses SBN resistance or tolerance. Generally, when a single mode of action is used (i.e., either the pesticide alone, or the SBN resistant or tolerant plant alone), the pest, over time, may obtain an increased tolerance to a single mode of action. This increased tolerance may necessitate the use of increased pesticidal dosages, or may render the mode of action wholly ineffective at controlling pests. However, with a dual-mode or action, this increased tolerance is slowed which effectively extends the useful life of both the pesticide and the SBN resistant or tolerant plant.

As mentioned above, the advantageous properties are not limited to pesticidal activity and the extension of useful pesticidal lives, but refer to numerous synergistic properties of the present technology compared with the nematicide and the SBN resistant or tolerant plant alone. Examples of such additional advantageous properties may include at least one of: extension of the pesticidal spectrum of action to other pests, for example to resistant strains; reduction in the application rate of the nematicides, or sufficient control of the pests with the aid of the compositions according to the invention even at an application rate of the nematicides alone and the plant alone are ineffective; improved quality of produce such as higher content of nutrient or oil, enhanced shelf life, reduced content of toxic products such as mycotoxins, reduced content of residues or unfavorable constituents, better digestability; improved tolerance to unfavorable temperatures, drought tolerance, enhanced assimilation rates such as nutrient uptake, water uptake and photosynthesis; favorable crop properties such as altered leaf area, increased yields, favorable-germination properties, flower set increase, or other advantages known to those skilled in the art.

In certain embodiments of the present invention, the nematicides suitable for use in the present technology comprise at least one member selected from the group consisting of a nematode-antagonistic biocontrol agent, such as nematophagous fungi and nematophagous bacteria, and synthetic nematicides. The term "nematode-antagonistic biocontrol agent" as used herein refers to an organism that inhibits nematode activity, growth or reproduction, or reduces nematode disease in plants or an organism which produces substances, e.g. proteins, chemicals, etc. toxic to nematodes or substances that inhibit hatching.

"Inhibition of nematode growth" refers to any aspect by which nematode disease in a plant is reduced, including, but not limited to, slowing nematode growth; reducing reproduction, hatching, mate and host-finding; and killing nematodes.

The present technology also provides embodiments in which the nematode-antagonistic biocontrol agent includes a nematophagous fungi, such as, but not limited to, ARF18 (Arkansas Fungus 18); *Arthrobotrys* spp., for example, *Arthrobotrys oligospora*, *Arthrobotrys superb* and *Arthrobotrys dactyloides*; *Chaetomium* spp., for example, *Chaetomium globosum*; *Cylindrocarpon* spp., for example, *Cylindrocarpon heteronema*; *Dactylaria* spp., for example, *Dactylaria candida*; *Exophilia* spp., for example, *Exophilia jeanselmei* and *Exophilia psiciphila*; *Fusarium* spp., for example, *Fusarium aspergilus* and *Fusarium solani*; *Gliocladium* spp., for example, *Gliocladium catenulatum*, *Gliocladium roseum* and *Gliocladium virens*; *Harposporium* spp., for example, *Harposporium anguillulae*; *Hirsutella* spp., for example, *Hirsutella rhossiliensis* and *Hirsutella minnesotensis*; *Lecanicillium* spp., for example, *Lecanicillium lecanii* (=*Verticillium lecanii*); *Meristacrum* spp., for example, *Meristacrum asterospermum*; *Monacrosporium* spp., for example, *Monacrosporium drechsleri*, *Monacrosporium gephyropagum* and *Monacrosporium cionopagum*; *Myrothecium* spp., for example, *Myrotehcium verrucaria*; *Nematoctonus* spp., for example, *Nematoctonus geogenius*, *Nematoctonus leiosporus*; *Neocosmospora* spp., for example, *Neocosmospora vasinfecta*; *Paecilomyces* spp., for example, *Paecilomyces lilacinus*; *Pochonia* spp., for example, *Pochonia chlamydosporia* (=*Vercillium chlamydosporiumi*); *Stagonospora* spp., for example, *Stagonospora heteroderae* and *Stagonospora phaseoli*; and vesicular-arbuscular mycorrhizal fungi.

The present technology also provides embodiments in which the nematode-antagonistic biocontrol agent includes a nematophagous bacteria, such as, but not limited to, obligate parasitic bacteria, opportunistic parasitic bacteria, rhizobacteria, parasporal Cry protein-forming bacteria, endophytic bacteria and symbiotic bacteria. In particular embodiments, the biocontrol agent can be a bacteria species selected from *Actinomycetes* spp., *Agrobacterium* spp., *Arthrobacter* spp., *Alcaligenes* spp., *Aureobacterium* spp., *Azobacter* spp., *Beijerinckia* spp., *Burkholderia* spp., *Chromobacterium* spp., *Clavibacter* spp., *Clostridium* spp., *Comomonas* spp., *Corynebacterium* spp., *Curtobacterium* spp., *Desulforibtio* spp., *Enterobacter* spp., *Flavobacterium* spp., *Gluconobacter* spp., *Hydrogenophage* spp., *Klebsiella* spp., *Methylobacterium* spp., *Phyllobacterium* spp., *Phingobacterium* spp., *Photorhabdus* spp., *Rhizobium* spp., *Serratia* spp., *Stenotrophomonas* spp., *Xenorhadbus* spp. *Variovorax* spp., *Pasteuria* spp., *Pseudomonas* spp., *Bacillus* spp., and *Paenibacillus* spp.

As a non-limiting example, the bacterial biological control agents can include endoparasitic bacterium of the genus *Burkholderia cepacia*; *Pasteuria*, e.g. *Pasteuria penetrans*, *Pasteuria thornei*, *Pasteuria nishizawae*, *Pasteuria ramosa*, *Candidatus Pasteuria usgae* sp. nov.; *Brevibacillus laterosporus* strain G4; *Pseudomonas fluorescens*; *Corynebacterium paurometabolu*, *Corynebacterium pauronietabolum*; *Paenibacillus macerans*; Rhizobacteria; bacterium of the genus *Bacillus*, e.g. *Bacillus* sp B16, *Bacillus agri*, *Bacillus aizawai*, *Bacillus albolactis*, *Bacillus amyloliquefaciens*, *Bacillus cereus*, *Bacillus coagulans*, *Bacillus endoparasiticus*, *Bacillus endorhythmos*, *Bacillus firmus*, *Bacillus kurstaki*, *Bacillus Iacticola*, *Bacillus lactimorbus*, *Bacillus lactis*, *Bacillus laterosporus*, *Bacillus lentimorbus*, *Bacillus licheniformis*, *Bacillus megaterium*, *Bacillus medusa*, *Bacillus metiens*, *Bacillus natto*, *Bacillus nigrificans*, *Bacillus popillae*, *Bacillus pumilus*, *Bacillus siamensis*, *Bacillus sphaericus*, *Bacillus* spp., *Bacillus subtilis*, *Bacillus thuringiensis* (including those forming Cry proteins toxic to nematodes and/or nematode larvae such as Cry5, Cry6, Cry12, Cry13, Cry14 and Cry21), *Bacillus thuringiensis israelensis*; *Bacillus thuringiensis kurstaki*, *Bacillus uniflagellates*, plus those listed in the category of *Bacillus* Genus in the "Bergey's Manual of Systematic Bacteriology, First Ed. (1986)" alone or in combination. In an embodiment, the nematicidal biological control agent is at least one *B. firmus* CNCM 1-1582 spore and/or *B. cereus* strain CNCM 1-1562 spore as disclosed in U.S. Pat. No. 6,406,690, which is incorporated herein by reference in its entirety. In other embodiments, the bacteria is at least one *B. amyloliquefaciens* IN937a, at least one *Bacillus subtilis* strain designation GB03, or at least one *B. pumilus* strain designation GB34. Combinations of the four species of above-listed bacteria, as well as other spore-forming, root-colonizing bacteria known to exhibit agriculturally beneficial properties are within the scope and spirit of the present invention. Some embodiments according to the invention are also those compositions that comprise mutants of *B. firmus* CNCM 1-1582 spore and/or *B. cereus* strain CNCM 1-1562 spore. Included in embodiments of the present invention are those mutants that have a nematicidal activity. Examples of synthetic nematicides include acibenzolar-S-methyl, an avermectin (e.g., abamectin), carbamate nematicides (e.g., aldicarb, thiadicarb, carbofuran, carbosulfan, oxamyl, aldoxycarb, ethoprop, methomyl, benomyl, alanycarb), organophosphorus nematicides (e.g., phenamiphos (fenamiphos), fensulfothion, terbufos, fosthiazate, dimethoate, phosphocarb, dichlofenthion, isamidofos, fosthietan, isazofos ethoprophos, cadusafos, terbufos, chlorpyrifos, dichlofenthion, heterophos, isamidofos, mecarphon, phorate, thionazin, triazophos, diamidafos, fosthietan, phosphamidon), and certain fungicides, such as captan, thiophanate-methyl and thiabendazole.

The term "avermectin" refer to any of the members of the avennectin class of compounds, which are disclosed as milbemycins and avenmectins, for example, in U.S. Pat. Nos. 4,310,519; and 4,427,663. Avenmectins are known to the person skilled in the art. They are a group of structurally closely related pesticidally active compounds that are obtained by fermentation of a strain of the microorganism *Streptomyces avermitilis*. Derivatives of avermectins can be obtained via conventional chemical syntheses. "Abamectin" is a mixture of avermectin $B_{1a}$ and avermectin $B_{1b}$ and is described, for example, in The Pesticide Manual, 10.sup.th Ed. (1994), The British Crop Protection Council, London, page 3. The designation "abamectin" and "avenmectin" include derivatives. Acceptable avermectins useful in the invention include, for example, ivermectin, doramectin, selamectin, emamectin, and abamectin.

Preferred nematicides include ARF18; *Arthrobotrys* spp.; *Chaetomium* spp.; *Cylindrocarpon* spp.; *Exophilia* spp.; *Fusarium* spp.; *Gliocladium* spp.; *Hirsutella* spp.; *Lecanicillium* spp.; *Monacrosporium* spp.; *Myrothecium* spp.; *Neocosmospora* spp.; *Paecilomyces* spp.; *Pochonia* spp.; *Stagonospora* spp.; vesicular-arbuscular mycorrhizal fungi, *Burkholderia* spp.; *Pasteuria* spp., *Brevibacillus* spp.; *Pseudomonas* spp.; Rhizobacteria; *Bacillus* spp.

Particularly preferred nematicides include ARF18, *Arthrobotrys oligospora*, *Arthrobotrys dactyloides*, *Chaetomium globosum*, *Cylindrocarpon heteronema*, *Exophilia jeanselmei*, *Exophilia pisciphila*, *Fusarium aspergilus*, *Fusarium solani*, *Gliocladium catenulatum*, *Gliocladium roseum*, *Gliocladium virens*, *Hirsutella rhossiliensis*, *Hirsutella minnesotensis*, *Lecanicillium lecanii*, *Monacrosporium drechsleri*, *Monacrosporium gephyropa gum*, *Myrotehcium verrucaria*, *Neocosmospora vasinfecta*, *Paecilomyces lilacinus*, *Pochonia chlamydosporia*, *Stagonospora heteroderae*, *Stagonospora phaseoli*, vesicular-arbuscular mycorrhizal fungi, *Burkholderia cepacia*, *Pasteuria penetrans*, *Pasteuria thornei*, *Pasteuria nishizawae*, *Pasteuria ramosa*, *Brevibacillus laterosporus* strain G4, *Pseudomonas fluorescens*, Rhizobacteria and *Bacillus thuringiensis*.

Some varieties of sugar beet have been bred (both transgenic and non-transgenic) to express a characteristic in the plant which reduces damage due to the SBN. As discussed above, embodiments of the present invention include methods that utilize such varieties of sugar beets. The mentioned varieties are of both transgenic and non-transgenic seeds with characteristics of reducing SBN damage. These varieties may include both tolerant and resistant varieties to SBN. The methods of the present invention may include any variety of sugar beet, both transgenic and non-transgenic The nematicidally-effective amount of a given nematicide will vary, depending upon factors including, but not limited to, the plant species, the surface area of the seed, the type of carrier, presence or absence of other active ingredients, the method of formulation, the route of delivery, the specific nematicide used including the different fungi or bacteria species, the target nematode species, and the seriousness of the nematode infection or damage to the plant(s).

"A nematicidally effective amount" as used herein refers to an amount of nematicide capable of killing, controlling, or infecting nematodes, retarding the growth or reproduction of nematodes, reducing a nematode population, and/or reducing damage to plants caused by nematodes.

The method according to the invention allows pests of the abovementioned type to be controlled, i.e. contained, repelled or destroyed, which occur, in particular, on SBN resistant or tolerant plants.

Depending on the intended aims and the prevailing circumstances, the pesticides within the scope of the technology, which are known per se, are generally formulated as emulsifiable concentrates, suspension concentrates, directly sprayable or dilutable solutions, spreadable pastes, dilute emulsions, wettable powders, soluble powders, dispersible powders, dusts, granules or encapsulations in polymeric substances which comprise a nitroimino- or nitroguanidino-compound.

The active ingredients are employed in these compositions together with at least one of the auxiliaries conventionally used in art of formulation, such as extenders, for example solvents or solid carriers, or such as surface-active compounds (surfactants). Formulation auxiliaries which are used are, for example, solid carriers, solvents, stabilizers, "slow release" auxiliaries, colourants and, if appropriate, surface-active substances (surfactants). Suitable carriers and auxiliaries are all those substances which are conventionally used for crop protection products. Suitable auxiliaries such as solvents, solid carriers, surface-active compounds, non-ionic surfactants, cationic surfactants, anionic surfactants and other auxiliaries in the compositions employed according to the invention are, for example, those which have been described in EP-A-736 252.

The action of the compositions within the scope of the technology which comprise nematicidal compounds can be extended substantially and adapted to prevailing circumstances by adding other insecticidally, acaricidally and/or fungicidally active ingredients. Suitable examples of added active ingredients include: neonicitinoid compounds such as thiamethoxam, imidacloprid, clothianidin, thiacloprid or acetamiprid; beta-cyfluthrin, cyantraniliprole, diafenthiuron, diazinon, emamectin, emamectin benzoate, fenoxycarb, fipronil, flonicamid, lambda-cyhalothrin, methiocarb, pymetrozine, pyriproxyfen, pyrifluquinazon, spinetoram, spinosad, spirotetramat, tefluthrin, thiodicarb or Ti-435. As an example, formulated compositions for applying to seeds generally comprise 0.1 to 99%, in particular 0.1 to 95%, of a nematicidal compound and 1 to 99.9%, in particular 5 to 99.9%, of at least one solid or liquid auxiliary, it being possible, for 0 to 25%, in particular 0.1 to 20%, of the compositions to be surfactants (% in each case meaning percent by weight). While concentrated compositions are more preferred as commercial products, the end user will, as a rule, use dilute compositions which have considerably lower concentrations of active ingredient.

Formulated compositions may also comprise other solid or liquid auxiliaries, such as stabilisers, for example epoxidized or unepoxidized vegetable oils (for example epoxidized coconut oil, rapeseed oil or soya bean oil), antifoams, for example silicone oil, preservatives, viscosity regulators, binders and/or tackifiers, and also fertilizers or other active ingredients for achieving specific effects, for example, bactericides, fungicides, nematicides, molluscicides or herbicides.

Compositions can be produced in a known manner, for example prior to mixing with the auxiliary/auxiliaries by grinding, screening and/or compressing the active ingredient, for example to give a particular particle size, and by intimately mixing and/or grinding the active ingredient with the auxiliary/auxiliaries.

The methods according to the invention for controlling pests of the abovementioned type may be carried out in a manner known to those skilled in the art, depending on the intended aims and prevailing circumstances, that is to say by spraying, wetting, atomizing, dusting, brushing on, seed dressing, scattering or pouring of the composition. In the case of spore forming bacteria and fungi, the application rates with respect to plant propagation material (e.g. seed treatment) may range from about $1 \times 10^4$ to $1 \times 10^{12}$ (or more) spores/seeds. In additional embodiments, the spore concentration may range from about $1 \times 10^6$ to about $1 \times 10^{11}$ spores/seed, $1 \times 10^6$ to about $1 \times 10^{10}$ spores/seed, $1 \times 10^6$ to about $1 \times 10^9$ spores/seed, $1 \times 10^6$ to about $1 \times 10^8$ spores/seed, or $1 \times 10^6$ to about $1 \times 10^7$ spores/seed. In additional embodiments, the spore concentration may range from about $1 \times 10^7$ to about $1 \times 10^{11}$ spores/seed, $1 \times 10^7$ to about $1 \times 10^{10}$ spores/seed, $1 \times 10^7$ to about $1 \times 10^9$ spores/seed, or $1 \times 10^7$ to about $1 \times 10^8$ spores/seed. In additional embodiments, the spore concentration may be about $1 \times 10^7$ spores/seed. For the synthetic nematicides, preferred rates include at least 0.03 mg active ingredient (a.i.)/seed, preferably from 0.03 to 0.5 mg a.i./seed.

The propagation material can be treated with the composition prior to application, for example, seed being dressed prior to sowing. The active ingredient may also be applied to seed kernels (coating), either by soaking the kernels in a liquid composition or by coating them with a solid composition.

Examples of formulations of nematicidal compounds which can be used in the method according to the invention, for instance solutions, granules, dusts, sprayable powders, emulsion concentrates, coated granules and suspension concentrates.

Yield Response Experiment

The yield response study illustrates the unexpected increase in yield achieved by using a nematode-antagonistic biocontrol agent with SBN resistant or tolerant varieties. Multiple field trials were conducted across Germany, Czech Republic and Denmark. The results of nine different trials are presented below utilizing seed treatments on sugar beet seeds to combat nematodes.

The tests presented below were run on both susceptible and SBN tolerant varieties of sugar beet seeds. In particular, the susceptible variety is known by the trade name INVICTA and the tolerant variety is known by the trade name CACTUS. Each trial, on both the susceptible and tolerant variety, was run with a Control check that included no nematicide, a treatment on the seed with *Pasteuria nishizawae* at about $1 \times 10^6$ spores/seed, a treatment on the seed with *Pasteuria nishizawae* at about $1 \times 10^7$ spores/seed, and a treatment on the seed that included a commercial soil applied standard nematicide.

The results of trails are presented below where yield data has been averaged.

INVICTA Susceptible Sugar Beet Seeds

| Nematicide Treatment | White Sugar yield/ha |
| --- | --- |
| CHECK | 10.97 |
| *Pasteuria* $1 \times 10^6$ spores/seed | 11.09 |
| *Pasteuria* $1 \times 10^7$ spores/seed | 11.20 |
| Commercial Soil Nematicide | 11.30 |

CACTUS Tolerant Sugar Beet Seeds

| Nematicide Treatment | White Sugar yield/ha |
| --- | --- |
| CHECK | 12.40 |
| *Pasteuria* $1 \times 10^6$ spores/seed | 12.65 |
| *Pasteuria* $1 \times 10^7$ spores/seed | 12.93 |
| Commercial Soil Nematicide | 12.69 |

As the data shows above, tolerant varieties treated with *Pasteuria* showed an increase over commercial standards. In particular, the use of dual modes of action for combatting SBN with *Pasteuria* and a tolerant variety results in unexpected results when comparing the results with commercial nematicides.

Root and Sugar Yield Trial

The root and sugar yield response study illustrates the unexpected increase in root and sugar yield achieved by using a nematode-antagonistic biocontrol agent with SBN resistant or tolerant varieties. Multiple field trials were conducted across Nebraska, Colorado, and Idaho. The results of four different trials are presented below utilizing seed treatments on sugar beet seeds to combat nematodes.

The tests presented below were run on both susceptible and SBN tolerant varieties of sugar beet seeds. Each trial, on both the susceptible and tolerant variety, was run with a Control check that included no nematicide, a treatment on the seed with *Pasteuria nishizawae* at about $5 \times 10^6$ spores/seed, a treatment on the seed with *Pasteuria nishizawae* at about $1 \times 10^7$ spores/seed, a treatment on the seed with *Pasteuria nishizawae* at about $2 \times 10^7$ spores/seed and a treatment on the seed with *Pasteuria nishizawae* at about $4 \times 10^7$ spores/seed.

The results of trails are presented below where yield data has been averaged.

Susceptible Sugar Beet Seeds

| Nematicide Treatment | White Sugar Ton/Acre |
| --- | --- |
| CHECK | 2.4 |
| *Pasteuria* $5 \times 10^6$ spores/seed | 2.0 |
| *Pasteuria* $1 \times 10^7$ spores/seed | 2.5 |
| *Pasteuria* $2 \times 10^7$ spores/seed | 2.3 |
| *Pasteuria* $4 \times 10^7$ spores/seed | 2.4 |

| Nematicide Treatment | Root Yield Ton/Acre |
| --- | --- |
| CHECK | 20.8 |
| *Pasteuria* $5 \times 10^6$ spores/seed | 17.4 |
| *Pasteuria* $1 \times 10^7$ spores/seed | 19.9 |
| *Pasteuria* $2 \times 10^7$ spores/seed | 19.8 |
| *Pasteuria* $4 \times 10^7$ spores/seed | 19.5 |

Tolerant Sugar Beet Seeds

| Nematicide Treatment | White Sugar Ton/Acre |
| --- | --- |
| CHECK | 3.3 |
| *Pasteuria* $5 \times 10^6$ spores/seed | 3.6 |
| *Pasteuria* $1 \times 10^7$ spores/seed | 3.5 |
| *Pasteuria* $2 \times 10^7$ spores/seed | 3.7 |
| *Pasteuria* $4 \times 10^7$ spores/seed | 3.5 |

| Nematicide Treatment | Root Yield Ton/Acre |
| --- | --- |
| CHECK | 24.3 |
| *Pasteuria* $5 \times 10^6$ spores/seed | 26.1 |
| *Pasteuria* $1 \times 10^7$ spores/seed | 27.2 |
| *Pasteuria* $2 \times 10^7$ spores/seed | 27.2 |
| *Pasteuria* $4 \times 10^7$ spores/seed | 26.7 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range. It is further noted that, as used in this specification, the singular forms "a," "an," and "the" include plural referents unless expressly and unequivocally limited.

The invention claimed is:

1. A method of increasing yield of a sugar beet expressing sugar beet cyst nematode (SBN) resistance or tolerance and reducing a rate at which SBN pests acquire tolerances to pesticidal activity of sugar beet plants expressing SBN resistance or tolerance and pesticides, the method comprising: treating sugar beet propagation material expressing SBN resistance or tolerance with a composition wherein the only active component is *Pasteuria nishizawae*.

2. The method of claim 1, wherein the *Pasteuria nishizawae* is applied in a range from $1 \times 10^4$ to $1 \times 10^{12}$ spores/seed.

3. The method of claim 2, wherein the *Pasteuria nishizawae* is applied in a range from $1 \times 10^6$ to $1 \times 10^9$ spores/seed.

4. The method of claim 1, wherein the plant propagation material is a plant seed.

5. The method of claim 4, wherein the composition is applied as a seed coating.

6. The method of claim 5, wherein the plant propagation material is non-transgenic seeds.

7. The method of claim 5, wherein the plant propagation material is transgenic.

8. The method of claim 5, wherein the SBN pests is a nematode species.

9. The method of claim 1, wherein the composition is applied a a granule, dust, or powder.

10. The method of claim 1, wherein the composition is applied as a solution.

11. A method of increasing yield of a sugar beet expressing sugar beet cyst nematode (SBN) resistance or tolerance and reducing a rate at which SBN pests acquire tolerances to pesticidal activity of sugar beet plants expressing SBN resistance or tolerance and pesticides, the method comprising: treating sugar beet propagation material expressing SBN resistance or tolerance with a composition consisting essentially of *Pasteuria nishizawae*.

12. The method of claim 11, wherein the plant propagation material is a plant seed.

13. The method of claim 12, wherein the composition is applied as a seed coating.

14. The method of claim 12, wherein the *Pasteuria nishizawae* is applied in a range from $1 \times 10^4$ to $1 \times 10^{12}$ spores/seed.

15. The method of claim 14, wherein the *Pasteuria nishizawae* is applied in a range from $1 \times 10^6$ to $1 \times 10^9$ spores/seed.

16. A method of increasing yield of a sugar beet expressing sugar beet cyst nematode (SBN) resistance or tolerance and reducing a rate at which SBN pests acquire tolerances to pesticidal activity of sugar beet plants expressing SBN resistance or tolerance and pesticides, the method comprising: treating sugar beet propagation material expressing SBN resistance or tolerance with a composition consisting of *Pasteuria nishizawae*.

17. The method of claim 16, wherein the plant propagation material is a plant seed.

* * * * *